Aug. 17, 1954   R. HENRY   2,686,549
RESILIENT GAUGE WHEEL
Filed March 19, 1952

INVENTOR.
RAYMOND HENRY
BY
Merrill M. Blackburn
Atty.

UNITED STATES PATENT OFFICE 2,686,549

RESILIENT GAUGE WHEEL

Raymond Henry, Moline, Ill.

Application March 19, 1952, Serial No. 277,419

5 Claims. (Cl. 152—7)

The present invention relates to wheels, especially to such wheels as are used on farm implements. In planters, it has been the custom to use metal wheels with thin rims, said planters being provided with scrapers which are intended to scrape undesirable dirt from the rims of the wheels, but these have proven unsatisfactory because chunks of dirt collect and remain on the rims of the wheels, resulting in imperfect operation of the wheels.

It is therefore an object of this invention to provide a gauge wheel which will be satisfactory for the purpose intended; to provide a wheel with a flexible rim which will yield as it rolls over the ground; to provide a wheel which is self-cleaning; and such further objects, advantages, and capabilities as will hereafter appear and as are inherent in the construction disclosed herein. My invention further resides in the combination, construction, and arrangement of parts illustrated in the accompanying drawings and, while I have shown therein what is now regarded as the preferred embodiment of this invention, I desire the same to be understood as illustrative only and not to be interpreted in a limiting sense.

In the drawings annexed hereto and forming a part hereof,

Figure 3:
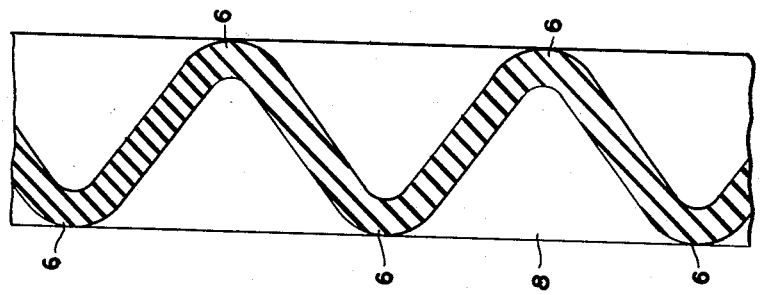
Fig. 3 is a partial development along the line 3—3, in Fig. 2.
Figure 2:
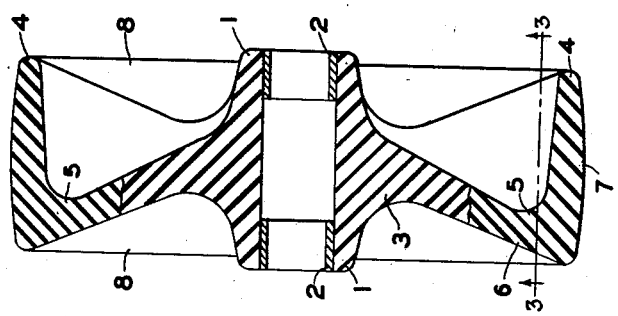
Fig. 2 shows a section taken substantially along the plane indicated by the line 2—2 in Fig. 1.
Figure 1:
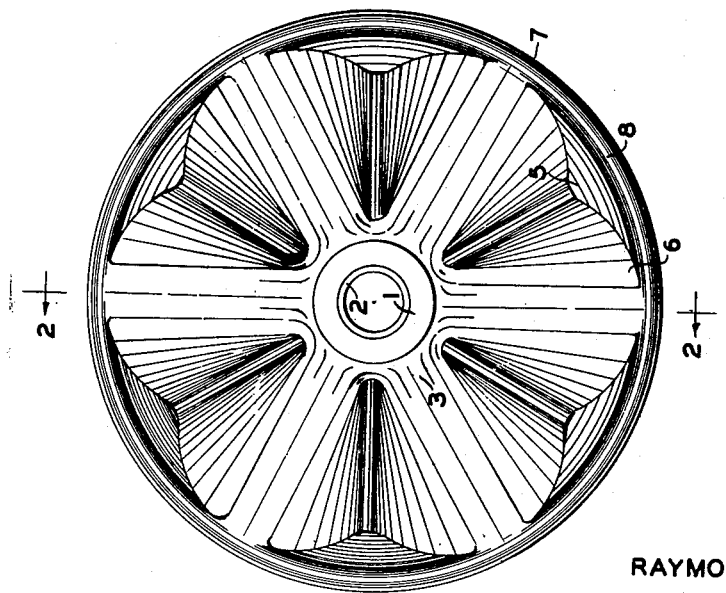
Fig. 1 shows the wheel of this invention in side elevation.

Reference will now be made in greater detail to the annexed drawings for a more complete description of this invention. This wheel has a hub 1, in the ends of which metal bushings 2 are forceably inserted. The hub and the central part 3 of the disk are preferably formed of a rubber composition which is made harder and less flexible than the rim 4. The rim 4 and the part 5 of the disk, which part is adjacent the rim 4, are much more flexible than the hub 1 and the central part 3 of the disk and, therefore, the rim yields between what may be compared to spokes 6. The disk comprises the inflexible part 3 and the flexible part 5 and extends from the hub in the center of the wheel to the rim on the surface thereof. It will therefore be seen that the rim yields to pressure, first upon one side and then upon the other, the wheel presenting upon one side, alternate ribs and depressions and, conversely, upon the other side, depressions and ribs. The face of the wheel is curved and the parts 8 of the rim between the spokes 6 are yieldable to external pressure.

It is of course understood that the specific description of structure set forth above may be departed from without departing from the spirit of this invention as disclosed herein and as defined by the appended claims.

Having now described my invention, I claim:

1. A gauge wheel comprising a hub of relatively rigid rubber composition with inserts of metal in the ends of the hub, a disk outside of the hub and connected thereto, said disk extending outwardly from the hub and comprising two parts, one nearer the hub and the other farther from the hub, the part of the disk nearer the hub being of the same composition as the hub, the part of the disk farther from the hub being of a more yieldable composition, and a rim secured to the second part of the disk, said rim being of substantially the same consistency as said part of the disk farther from the hub, and flexible in a substantially radial direction.

2. In a wheel of rubber composition, a rigid hub and a disk having an inner part of a rigid consistency and an outer part farther from the hub of a more yielding consistency, said wheel having a rim integrally constructed with the outer part of the disk, the rim and the outer part of the disk being of substantially the same consistency, the disk being of alternately extending corrugations laterally of the wheel, the corrugations extending radially from the hub to the rim and progressively increasing in depth from the hub to the rim, the depth of each corrugation at the rim being substantially the same as the width of the rim.

3. A gauge wheel having a hub, a disk, and a rim, the disk having corrugations extending from the hub to the rim, the depth of the corrugations at the rim being substantially the same as the width of the rim, the rim being joined to the corrugated portions so that, adjacent one corrugation, one side of the rim is deflectable radially inwardly while, at the next adjacent corrugation, the opposite side of the rim is deflectable radially inwardly, the rim being formed of flexible rubber.

4. A wheel formed substantially entirely of rubber-like material and including an axially extending hub, a rim, and a disk having corrugations extending laterally in opposite directions from the hub to the rim and progressively increasing in depth from the hub to the rim, the disk having an edge portion joined integrally with the rim.

5. A wheel comprising a hub and a disk of integral molded construction, the disk having an inner section of more solidly molded material and a radially outer portion which is molded less severly, the inner section of the disk being less yielding than the outer portion thereof, the disk being corrugated and secured at its outer edge to a rim, said rim, between corrugations, being radially yieldable to shed dirt collecting on the wheel during operation.

References Cited in the file of this patent

UNITED STATES PATENTS

| Number | Name | Date |
|---|---|---|
| 631,126 | Prouty | Aug. 15, 1899 |
| 2,603,267 | Simpson | July 15, 1952 |
| 2,605,592 | Cosmos | Aug. 5, 1952 |

FOREIGN PATENTS

| Number | Country | Date |
|---|---|---|
| 138,540 | Great Britain | Feb. 12, 1920 |